United States Patent
Lee

(10) Patent No.: US 9,734,647 B2
(45) Date of Patent: Aug. 15, 2017

(54) SMART KEY SYSTEM AND OPERATING METHOD THEREOF

(71) Applicant: HYUNDAI MOBIS Co., Ltd., Seoul (KR)

(72) Inventor: Ji yeon Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 12 days.

(21) Appl. No.: 14/966,082

(22) Filed: Dec. 11, 2015

(65) Prior Publication Data
US 2016/0189458 A1   Jun. 30, 2016

(30) Foreign Application Priority Data
Dec. 31, 2014   (KR) .................. 10-2014-0195442

(51) Int. Cl.
G07C 9/00 (2006.01)
B60R 25/24 (2013.01)
H04W 4/02 (2009.01)

(52) U.S. Cl.
CPC .......... G07C 9/00309 (2013.01); B60R 25/24 (2013.01); G07C 9/00111 (2013.01); G07C 2009/00396 (2013.01); G07C 2009/00769 (2013.01); G07C 2209/63 (2013.01); H04W 4/023 (2013.01)

(58) Field of Classification Search
CPC combination set(s) only.
See application file for complete search history.

(56) References Cited

U.S. PATENT DOCUMENTS

2012/0221189 A1*   8/2012   Konet ................. G01C 22/006
                                                   701/29.1

* cited by examiner

Primary Examiner — Kabir A Timory
(74) Attorney, Agent, or Firm — H.C. Park & Associates, PLC

(57) ABSTRACT

A method of operating an electrical control unit of a smart key system includes receiving a first GPS coordinate that is transmitted from a smart key, calculating a distance from the smart key based on the first GPS coordinate and a second GPS coordinate of a vehicle that is received from a GPS satellite, determining whether the distance is within a predetermined reference distance, transmitting a first communication request signal to the smart key when the distance is within the reference distance, determining whether a first communication response signal corresponding to the first communication request signal is received from the smart key, performing the first communication with the smart key when the first communication response signal is received, and controlling the vehicle in accordance with a control signal transmitted from the smart key based on the first communication.

7 Claims, 2 Drawing Sheets

SMART KEY SYSTEM AND OPERATING METHOD THEREOF

CROSS-REFERENCE TO RELATED APPLICATIONS

The present application claims priority from and the benefit of Korean Patent Application Number 10-2014-0195442, filed on Dec. 31, 2014, which is hereby incorporated by reference for all purposes as if fully set forth herein.

BACKGROUND

Field

Exemplary embodiments relate to a smart key system, and an operating method thereof. More particularly, exemplary embodiments relate to an operating method of a smart key system which actively switches a wireless communication interface to transmit and receive data.

Discussion of the Background

Generally, a smart key system for a vehicle is a device which prevents a negligent action from occurring, such as the unintentional opening of a door.

The smart key may include at least one of an immobilizer which controls the bidirectional communication between a smart key receiver and a smart key control unit mounted in the vehicle to lock and unlock a door of the vehicle, turn on the ignition, and activate a security function.

When a user who possesses a smart key that is part of a smart key system approaches the vehicle, a door may be unlocked through wireless identification ("ID") authentication, and wireless ID authentication may be performed to enable ignition of the engine. However, existing smart key systems are unsafe and expose passengers to crimes because they only lock the door of the vehicle after driving for a predetermined amount of time.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an operating method of a smart key system which actively switches between various wireless communication interfaces to transmit and receive data.

Additional aspects will be set forth in the detailed description which follows, and, in part, will be apparent from the disclosure, or may be learned by practice of the inventive concept.

An exemplary embodiment discloses a method of operating an electrical control unit of a smart key system includes receiving a first GPS coordinate that is transmitted from a smart key, calculating a distance from the smart key based on the first GPS coordinate and a second GPS coordinate of a vehicle that is received from a GPS satellite, determining whether the distance is within a predetermined reference distance, transmitting a first communication request signal to the smart key when the distance is within the reference distance, determining whether a first communication response signal corresponding to the first communication request signal is received from the smart key, performing the first communication with the smart key when the first communication response signal is received, and controlling the vehicle in accordance with a control signal transmitted from the smart key based on the first communication.

An exemplary embodiment discloses a smart key system that includes a smart key configured to receive a first GPS coordinate. The smart key system also includes an electronic control unit configured to receive the first GPS coordinate from the smart key, receive a second GPS coordinate from a GPS satellite, calculate a distance from the smart key based on the first GPS coordinate and the second GPS coordinate, transmit a first communication request signal to the smart key when the electronic control unit determines that the distance is within a predetermined reference distance, perform a first communication with the smart key when a first communication response signal for the first communication request signal is received from the smart key, and control the vehicle in accordance with a control signal that is transmitted from the smart key through the first communication is received The operating method of a smart key system according to the present disclosure has an advantage in that when a smart key is located within a predetermined reference distance, any one of the first and second communications may be performed with the smart key, so that a passenger can efficiently control the vehicle through the smart key.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
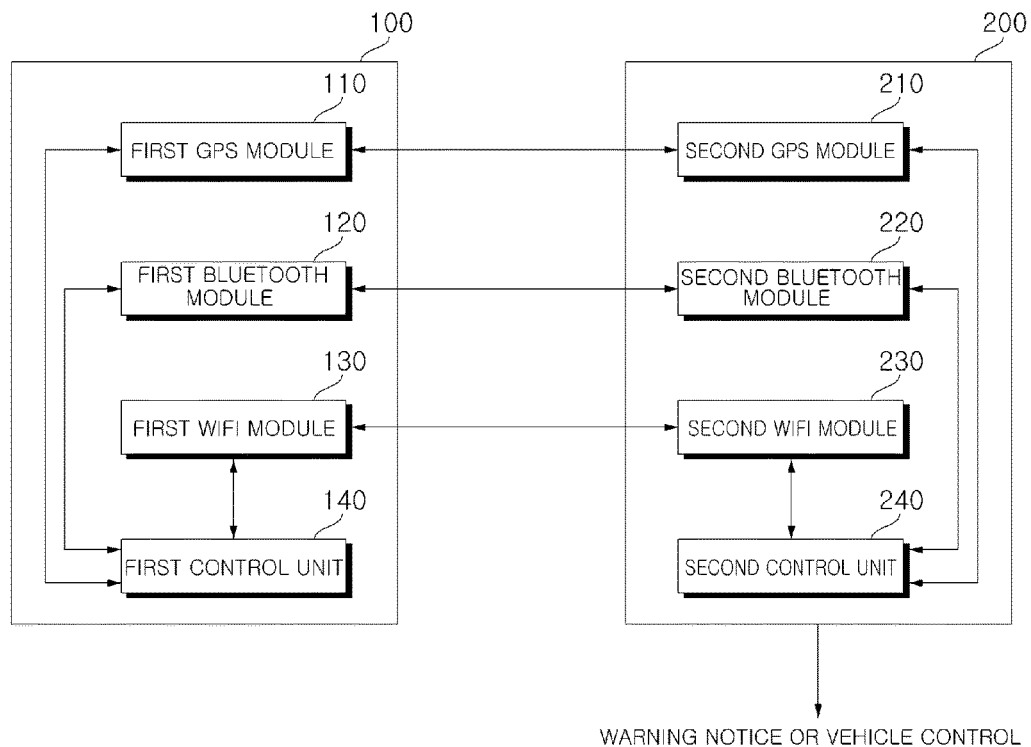
FIG. 1 is a control block diagram illustrating a control configuration of a smart key system according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described in more detail with reference to drawings.

FIG. 1 is a control block diagram illustrating a control configuration of a smart key system according to an exemplary embodiment.

Referring to FIG. 1, the smart key system may include a smart key 100 and an electronic control unit 200 (i.e., an electronic controller 200).

The smart key 100 may include a first GPS module 110, a first Bluetooth module 120, a first WiFi module 130, and a first control unit 140 (i.e., a first controller 140).

The first GPS module 110 may receive a first GPS coordinate for the smart key 100 from a GPS satellite and transmit the first GPS coordinate to the first control unit 140.

The first Bluetooth module 120 may perform wireless communication within a reference distance. The reference distance may be a range of about 20 meter (m) to about 30 meters (m) and the first Bluetooth module 120 may use a frequency band of about 2400 MHz to about 2483.5 MHz.

However, when the first Bluetooth module 120 is used, it may cause frequency interference between wireless systems which use a frequency band of about 2400 MHz to about 2483.5 MHz. In order to prevent frequency interference, the first Bluetooth module may use a frequency hopping method to establish synchronization with a second Bluetooth module 220 which is included in the electronic control unit 200, and then performs wireless communication therewith.

The first WiFi module 130 may perform WiFi direct communication and may be directly connected to a second WiFi module 230 which may be included in the electronic control unit 200 without using an internet network to transmit and receive data.

The first control unit 140 may control operations of the first GPS module 110, the first Bluetooth module 120, and the first WiFi module 130 and select any one of the first Bluetooth module 120 and the first WiFi module 130 to perform wireless communication with the electronic control unit 200 to transmit a control signal corresponding to a command input from a passenger to the electronic control unit 200. Throughout this application, the passenger may be a driver or any other person associated with the vehicle.

The electronic control unit 200 may include a second GPS module 210, the second Bluetooth module 220, the second WiFi module 230, and a second control unit 240 i.e., a second controller 240).

The second GPS module 210 may receive a second GPS coordinate for the electronic control unit 200 from the GPS satellite. The second GPS coordinate may also be a coordinate for a location of the vehicle. The second GPS module 210 may also receive a first GPS coordinate which is transmitted from the first GPS module 110 and transmit the first and second GPS coordinates to the second control unit 240.

When the first Bluetooth module 120 is located within the reference distance of about 20 m to about 30 m, the second Bluetooth module 220 may perform wireless communication with the first Bluetooth module 120.

The second Bluetooth module 220 may establish synchronization with the first Bluetooth module 120 using a frequency hopping method and then perform wireless communication with the first Bluetooth module 120.

The second WiFi module 230 may perform WiFi direct communication with the first WiFi module 130 and may be directly connected to the first WiFi module 130 without using an internet network to transmit and receive data.

The second control unit 240 may calculate a distance from the smart key 100 based on the first and second GPS coordinates which are transmitted from the second GPS module 210.

The second control unit 240 may calculate the distance in accordance with a deviation between coordinates based on any one of the first GPS coordinate and the second GPS coordinate, or any other suitable method.

The second control unit 240 may determine whether the distance is within the reference distance of about 20 m to about 30 m. When the distance is within the reference distance, the second Bluetooth module 220 may be controlled to transmit a first communication request signal to the first Bluetooth module 120 so as to perform wireless communication between the first and second Bluetooth modules 120 and 220.

The first communication request signal may be a signal which allows the first and second Bluetooth modules 120 and 220 to be synchronized with each other with a frequency hopping pattern in accordance with the frequency hopping method so that frequency interference does not occur between the first and second Bluetooth modules 120 and 220.

The second control unit 240 may determine whether a first communication response signal corresponding to the first communication request signal is received from the first Bluetooth module 120 to the second Bluetooth module 220.

When the first communication response signal is received, the second control unit 240 may determine that the first and second Bluetooth modules 120 and 220 are synchronized. When the second Bluetooth module 220 receives the control signal which is transmitted from the first Bluetooth module 120 while being synchronized with the first Bluetooth module 120, the second Bluetooth module 220 may control the vehicle in accordance with the control signal.

When the first communication response signal is not received from the first Bluetooth module 120, the second control unit 240 may operate the second WiFi module 230 to control the second communication request signal to be transmitted to the first WiFi module 130.

The second control unit 240 may determine whether a second communication response signal corresponding to the second communication request signal is received from the first WiFi module 130 to the second Wifi module 230.

When the second communication response signal is received, the second control unit 240 may perform communication between the first and second WiFi modules 130 and 230 and control the vehicle in accordance with the control signal transmitted from the first WiFi module 130.

When the second communication response signal is not received, the second control unit 240 may output a warning notice indicating that the communication with the smart key 100 is not performed.

The warning notice may use a buzzing sound or an LED warning light, but is not limited thereto.

Figure 2:
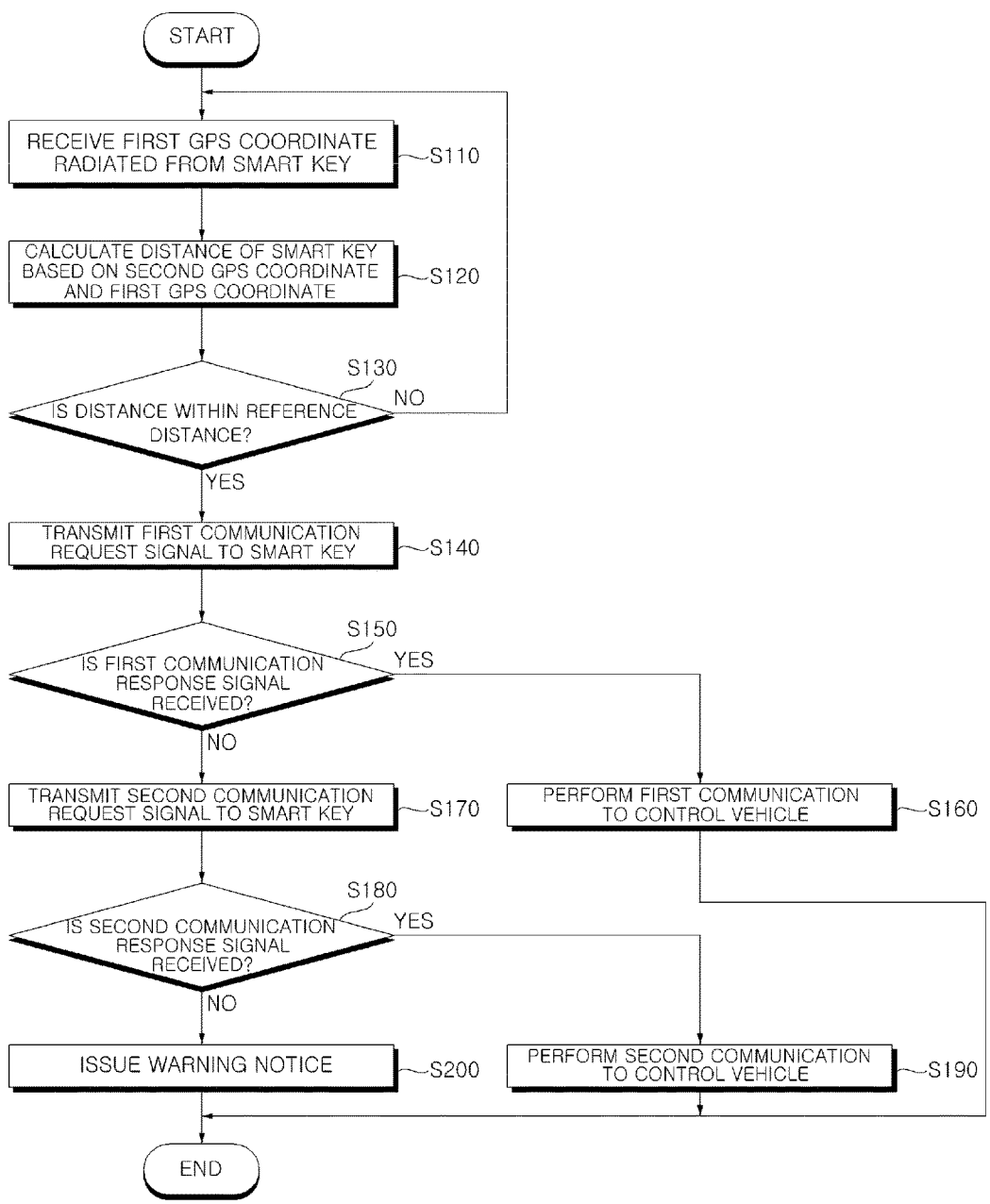
FIG. 2 is a flowchart illustrating an operating method of a smart key system according to an exemplary embodiment.

FIG. 2 is a flowchart illustrating an operating method of a smart key system according to an exemplary embodiment.

Referring to FIG. 2, an electronic control unit 200 of the smart key system receives a first GPS coordinate transmitted from a smart key 100 in step S110 and calculates a distance from the smart key 100 based on the first GPS coordinate and a second GPS coordinate which is received from the GPS satellite and is a coordinate of the vehicle in step S120.

The electronic control unit 200 may determine whether the distance is within a predetermined reference distance in step S130, and when the distance is within the reference distance, may transmit a first communication request signal to the smart key 100 in step S140.

The electronic control unit 200 may determine whether a first communication response signal corresponding to the first communication request signal is received from the smart key 100 in step S150, and when the first communication response signal is received, may perform a first communication with the smart key 100 and control the vehicle in accordance with a control signal transmitted from the smart key 100 in step S160.

When the first communication response signal is not received in step S150, the electronic control unit 200 may transmit a second communication request signal in step S170 and may determine whether a second communication response signal corresponding to the second communication request signal is received from the smart key 100 in step S180.

When the second communication response signal is received, the electronic control unit 200 may perform a second communication with the smart key 100 and control the vehicle in accordance with a control signal transmitted from the smart key 100 in step S190.

When the second communication response signal is not received in step S180, the electronic control unit 200 may output a warning notice indicating that the communication with the smart key 100 was not performed in step S200.

The control signal may include at least one of an input command which controls the locking and unlocking of a vehicle door or another vehicle function that may utilize smart key control, such as turning on the ignition.

The smart key system and/or one or more components thereof (e.g. a first control unit 140 (or first controller 140) of the smart key 100 and/or a second control unit 240 (or second controller 240) of the electronic control unit 200 (or electronic controller 200)), may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, the smart key system and/or one or more components thereof may include or otherwise be associated with one or more memories (not shown) including code (e.g., instructions) configured to cause the smart key system and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of operating an electrical controller of a smart key system, comprising:
    receiving a first GPS coordinate that is transmitted from a smart key;
    calculating a distance from the smart key based on the first GPS coordinate and a second GPS coordinate of a vehicle that is received from a GPS satellite;
    determining whether the distance is within a predetermined reference distance;
    transmitting a first communication request signal utilizing a first communication type to the smart key when the distance is within the predetermined reference distance;
    determining whether a first communication response signal corresponding to the first communication request signal is received from the smart key;
    performing a first communication with the smart key when the first communication response signal is received;

controlling the vehicle in accordance with a control signal transmitted from the smart key based on the first communication;

transmitting a second communication request signal utilizing a second communication type, which is different from the first communication type, when the first communication response signal is not received;

determining whether a second communication response signal corresponding to the second communication request signal is received from the smart key;

performing a second communication with the smart key when the second communication response signal is received;

controlling the vehicle in accordance with a control signal transmitted from the smart key based on the second communication; and outputting a warning notice indicating that the first communication and the second communication with the smart key was not performed when the second communication response signal is not received.

2. The method of claim 1, wherein the distance is calculated in accordance with a deviation between the first GPS coordinate and the second GPS coordinate.

3. The method of claim 1, wherein the predetermined reference distance is about 20 meters to about 30 meters.

4. The method of claim 1, wherein the first communication type is a Bluetooth communication.

5. The method of claim 1, wherein the second communication type is a WiFi communication.

6. A smart key system, comprising:
a smart key configured to receive a first GPS coordinate; and
an electronic controller configured to:
receive the first GPS coordinate from the smart key,
receive a second GPS coordinate from a GPS satellite,
calculate a distance from the smart key based on the first GPS coordinate and the second GPS coordinate,
transmit a first communication request signal utilizing a first communication type to the smart key when the controller determines that the distance is within a predetermined reference distance,
perform a first communication with the smart key when a first communication response signal for the first communication request signal is received from the smart key,
control a vehicle in accordance with a control signal that is transmitted from the smart key through the received first communication,
transmit a second communication request signal utilizing a second communication type, which is different from the first communication type, when the first communication response signal is not received,
perform a second communication with the smart key when a second communication response signal for the second communication request signal is received from the smart key,
control the vehicle in accordance with a control signal that is transmitted from the smart key through the received second communication, and
output a warning notice indicating that the first communication and the second communication with the smart key were not performed when the second communication response signal is not received.

7. The smart key system of claim 6, wherein the first communication type is a Bluetooth communication and the second communication type is a WiFi communication.

* * * * *